(12) United States Patent
Hagimori et al.

(10) Patent No.: US 7,440,195 B2
(45) Date of Patent: Oct. 21, 2008

(54) ZOOM LENS SYSTEM AND IMAGING DEVICE HAVING THE SAME

(75) Inventors: Hitoshi Hagimori, Ikoma-gun (JP); Kazuhiko Ishimaru, Kaizuka (JP)

(73) Assignee: Konica Minolta Camera, Inc., Sakai-Shi (JP)

( * ) Notice: Subject to any disclaimer, the term of this patent is extended or adjusted under 35 U.S.C. 154(b) by 799 days.

(21) Appl. No.: 10/812,190

(22) Filed: Mar. 29, 2004

(65) Prior Publication Data

US 2005/0014218 A1    Jan. 20, 2005

(30) Foreign Application Priority Data

Mar. 31, 2003   (JP)   ............... 2003-093533

(51) Int. Cl.
G02B 15/15   (2006.01)
(52) U.S. Cl. ..................................... 359/689
(58) Field of Classification Search ......... 359/680–682, 359/683, 686, 689–690
See application file for complete search history.

(56) References Cited

U.S. PATENT DOCUMENTS 4,999,007 A    3/1991   Aoki et al. ................. 350/426
5,111,338 A *  5/1992   Nakayama .................. 359/686
5,274,504 A * 12/1993   Itoh ........................... 359/676
5,745,301 A    4/1998   Betensky et al. ............ 359/689
5,999,329 A   12/1999   Ohtake ....................... 359/686
6,040,949 A *  3/2000   Ohno ......................... 359/689
2003/0189768 A1* 10/2003 Murayama .................. 359/782

FOREIGN PATENT DOCUMENTS

| JP | 1-191820 A | 8/1989 |
| JP | 1-216310 A | 8/1989 |
| JP | 6-175025 A | 6/1994 |
| JP | 9-179026 A | 7/1997 |
| JP | 2000-267009 A | 9/2000 |
| JP | 2001-343587 A | 12/2001 |

* cited by examiner

*Primary Examiner*—Ricky Mack
*Assistant Examiner*—James R Greece
(74) *Attorney, Agent, or Firm*—Sidley Austin LLP

(57) ABSTRACT

A zoom lens system for directing an optical image on an electric image sensor that includes a first lens unit disposed on a most object side and having a negative optical power, a second lens unit having a positive optical power, and a third lens unit including a most image side lens unit having at least a positive lens element and a negative lens element, wherein the following condition is satisfied:

$$3 < |fl/fw|$$

where fl is a focal length of the most image side lens unit, and fw is a focal length of the zoom lens system in a shortest focal length condition.

10 Claims, 10 Drawing Sheets

ZOOM LENS SYSTEM AND IMAGING DEVICE HAVING THE SAME

This application is based on application No. 2003-93533 filed in Japan, the content of which is hereby incorporated by reference.

FIELD OF THE INVENTION

The present invention relates to a zoom lens device having an image sensor converting an optical image formed on a light receiving surface of a CCD (charge coupled device), a CMOS (complementary metal-oxide semiconductor) sensor or the like into an electric signal, and more particularly, to a compact zoom lens device having a zoom lens system.

DESCRIPTION OF THE RELATED ART

In recent years, digital cameras have been becoming common that convert an optical image into an electric signal by using an image sensor such as a CCD or a CMOS sensor instead of silver halide film, convert the data to digital form, and record or transfer the digitized data. In such digital cameras, since CCDs and CMOS sensors having a large number of pixels such as two million pixels or three million pixels are comparatively inexpensively provided recently, high-performance zoom lens devices provided with a high-pixel image sensor are in greatly increasing demand. Of these zoom lens devices, a compact zoom lens device provided with a zoom lens system capable of performing zooming without any image quality degradation is particularly desired.

Further, in recent years, zoom lens devices have been becoming incorporated in or externally attached to personal computers, mobile computers, mobile telephones, PDAs (personal digital assistances) and the like because of improvements in the image processing capability of semiconductor elements and the like, which spurs the demand for compact and high-performance zoom lens devices.

As zoom lens systems used for such zoom lens devices, so-called minus lead zoom lens systems in which the lens unit disposed on the most object side has a negative optical power are proposed in large numbers. Minus lead zoom lens systems have features such that they are easily made wide-angle and that the lens back focal length necessary for the insertion of an optical low-pass filter is easily secured.

Conventional examples of minus lead zoom lens systems include zoom lens systems proposed as taking lens systems for film-based cameras. However, in these zoom lens systems, since the exit pupil of the lens system in the shortest focal length condition is situated comparatively near the image plane, it does not match with the pupil of the microlens provided so as to correspond to each pixel of the image sensor having a large number of pixels, so that a sufficient quantity of peripheral light cannot be secured. In addition, since the position of the exit pupil largely varies during zooming, the setting of the pupil of the microlens is difficult. Further, since required optical performance such as spatial frequency characteristics is completely different between silver halide film and image sensors to begin with, optical performance required of image sensors cannot be sufficiently secured. For these reasons, there has emerged a need for the development of a dedicated zoom lens system optimized for zoom lens devices having an image sensor.

As a minus lead zoom lens system for zoom lens devices having an image sensor, for example, U.S. Pat. No. 5,745,301 discloses a two-unit zoom lens system comprising a first lens unit having a negative optical power and a second lens unit having a positive optical power.

Moreover, Japanese Laid-Open Patent Application No. H01-191820 discloses a three-unit zoom lens system for video cameras comprising a first lens unit having a negative optical power, a second lens unit having a positive optical power and a third lens unit having a positive optical power.

Moreover, Japanese Laid-Open Patent Application No. H01-216310 discloses a four-unit zoom lens system for video cameras comprising a first lens unit having a negative optical power, a second lens unit having a positive optical power, a third lens unit having a negative optical power and a fourth lens unit having a positive optical power.

Further, Japanese Laid-Open Patent Application No. H09-179026 discloses a four-unit zoom lens system for electronic still cameras comprising a first lens unit having a negative optical power, a second lens unit having a positive optical power, a third lens unit having a negative optical power and a fourth lens unit having a positive optical power.

However, the zoom lens systems disclosed in U.S. Pat. No. 5,745,301 and Japanese Laid-Open Patent Applications Nos. H01-191820 and H01-216310 where the zoom ratio is approximately 2× are low in zoom ratio.

Moreover, in the zoom lens system disclosed in Japanese Laid-Open Patent Application No. H09-179026, although the zoom ratio is approximately 3×, the f-number in the longest focal length condition is as high as 7. Thus, this is not a bright zoom lens system.

Further, these zoom lens systems all require a large number of lens elements, and therefore lack in compactness, particularly compactness in the direction of the optical axis when housed (collapsed).

SUMMARY OF THE INVENTION

A principal object of the present invention is to provide a compact and high-performance zoom lens device.

Another object of the present invention is to provide a zoom lens device having a zoom lens system that is sufficiently small in the length in the direction of the optical axis when housed although having a high zoom ratio.

Still another object of the present invention is to provide a zoom lens device having a zoom lens system that is bright even in the longest focal length condition and is sufficiently small in the length in the direction of the optical axis when housed.

The above mentioned objects of the present invention are attained by providing a zoom lens device comprising from the object side: a zoom lens system; and an image sensor converting an optical image formed by the zoom lens system into electric image data, wherein the zoom lens system comprises at least: a first lens unit disposed on a most object side and having a negative optical power; a second lens unit having a positive optical power; and a third lens unit including a most image side lens unit having at least a positive lens element and a negative lens element, and the following condition is satisfied:

$$3 < |fl/fw|$$

where fl is a focal length of the most image side lens unit, and fw is a focal length of the zoom lens system in a shortest focal length condition.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENT

Hereinafter, an embodiment of the present invention will be described with reference to the drawings.

Figure 10:
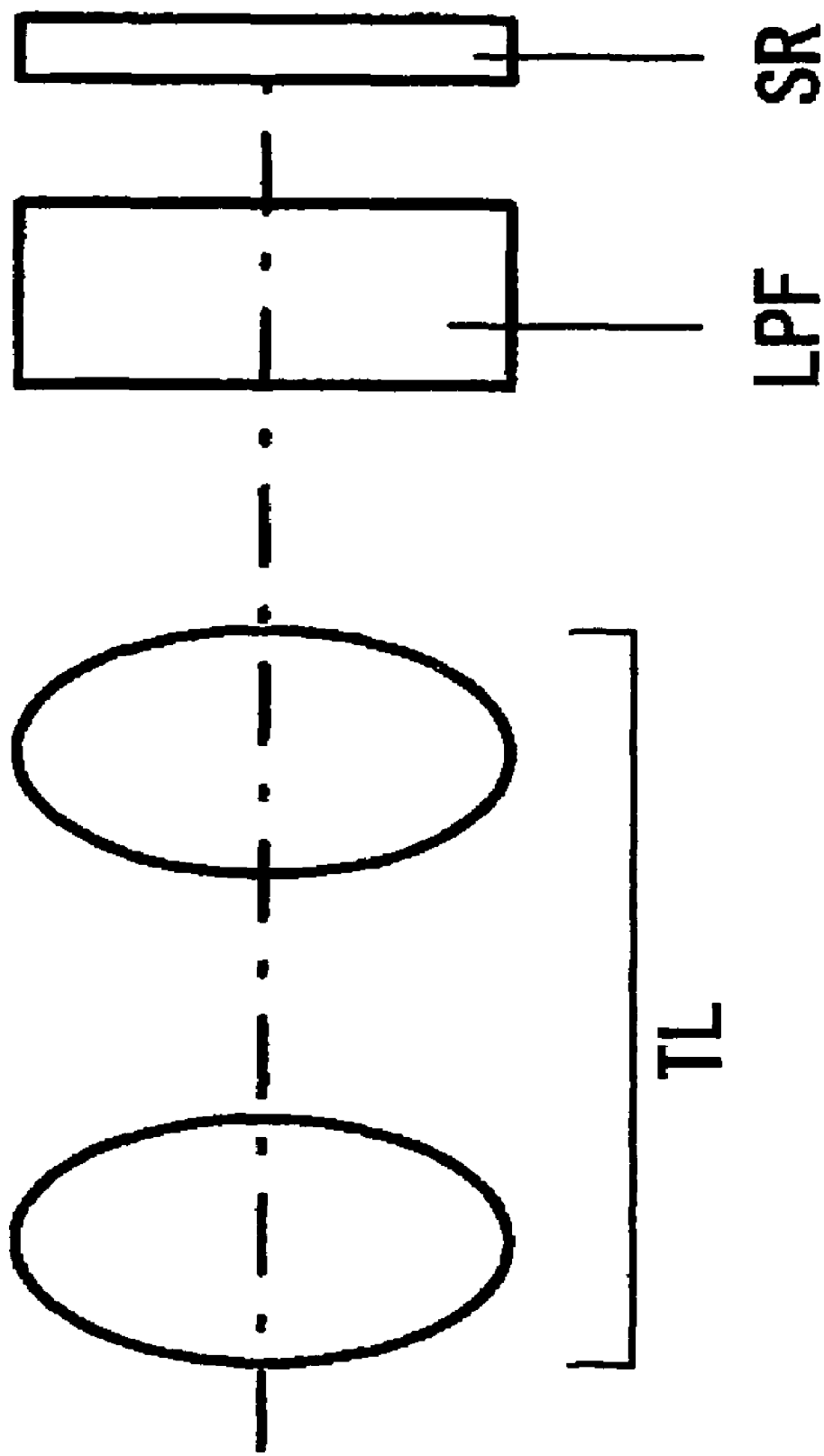
FIG. 10 is a view showing a schematic structure of a zoom lens device of the present invention.

A zoom lens device according to the embodiment of the present invention comprises, for example as shown in FIG. 10, from the object side (subject side): a zoom lens system TL forming an optical image of an object so as to be zoomable; an optical low-pass filter LPF; and an image sensor SR converting the optical image formed by the zoom lens system TL into an electric signal. The zoom lens device can be a component incorporated or externally attached to digital cameras, video cameras, personal computers, mobile computers, mobile telephones, PDAs and the like.

The optical low-pass filter LPF is disposed immediately in front of the image sensor, and has a specific cutoff frequency for adjusting the spatial frequency characteristics of the taking lens system to thereby eliminate the color moire generated in the image sensor. The optical low-pass filter of the embodiment is a birefringent low-pass filter formed by laminating a birefringent material such as crystal having its crystallographic axis adjusted in a predetermined direction, wave plates changing the plane of polarization, or the like. As the optical low-pass filter, a phase low-pass filter or the like may be adopted that attains necessary optical cutoff frequency characteristics by a diffraction effect. The optical low-pass filter may be omitted when higher priority is given to cost than to optical performance.

The image sensor SR comprises a CCD having a plurality of pixels, and converts the optical image formed by the zoom lens system into an electric signal by the CCD. The signal generated by the image sensor SR undergoes predetermined digital image processing or image compression processing as required, and are recorded into a memory (a semiconductor memory, an optical disk, etc.) as a digital video signal. Moreover, the signal generated by the image sensor SR is transmitted to another apparatus through a cable, or converted into an infrared signal or the like and transmitted to another apparatus by radio. A CMOS sensor may be used instead of a CCD.

Figure 1:
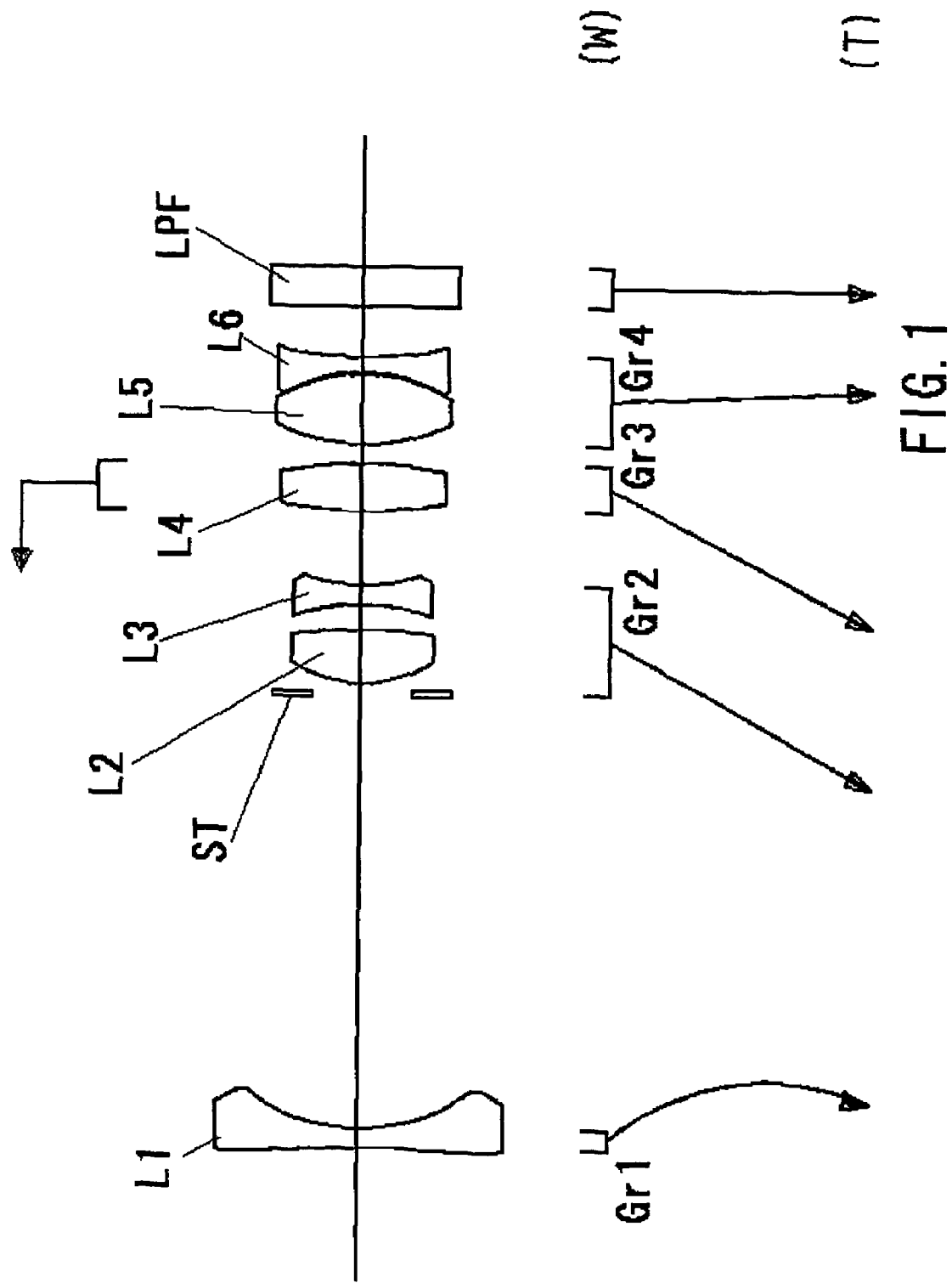
FIG. 1 is a lens arrangement view of a first embodiment (first example) of the present invention.

FIG. 1 is a view showing the lens arrangement of a zoom lens system of a first embodiment of the present invention. This zoom lens system comprises from the object side: a first lens unit Gr1 including only a first lens element L1 of a bi-concave configuration; a second lens unit Gr2 including a diaphragm ST, a second lens element L2 of a bi-convex configuration, and a third lens element L3 of a bi-concave configuration; a third lens unit Gr3 including only a fourth lens element L4 of a bi-convex configuration; and a fourth lens unit Gr4 including a fifth lens element L5 of a bi-convex configuration; and a sixth lens element L6 of a bi-concave configuration. In zooming from the shortest focal length condition to the longest focal length condition, the first lens unit Gr1 moves so as to draw a locus of a U-turn convex to the image side, the second lens unit Gr2 and the third lens unit Gr3 monotonously move toward the object side so that the distance therebetween slightly increases, and the fourth lens unit Gr4 monotonously moves toward the object side. In focusing from the infinity in-focus state to the finite object in-focus state, the fourth lens element L4 alone is moved toward the object side.

Figure 2:
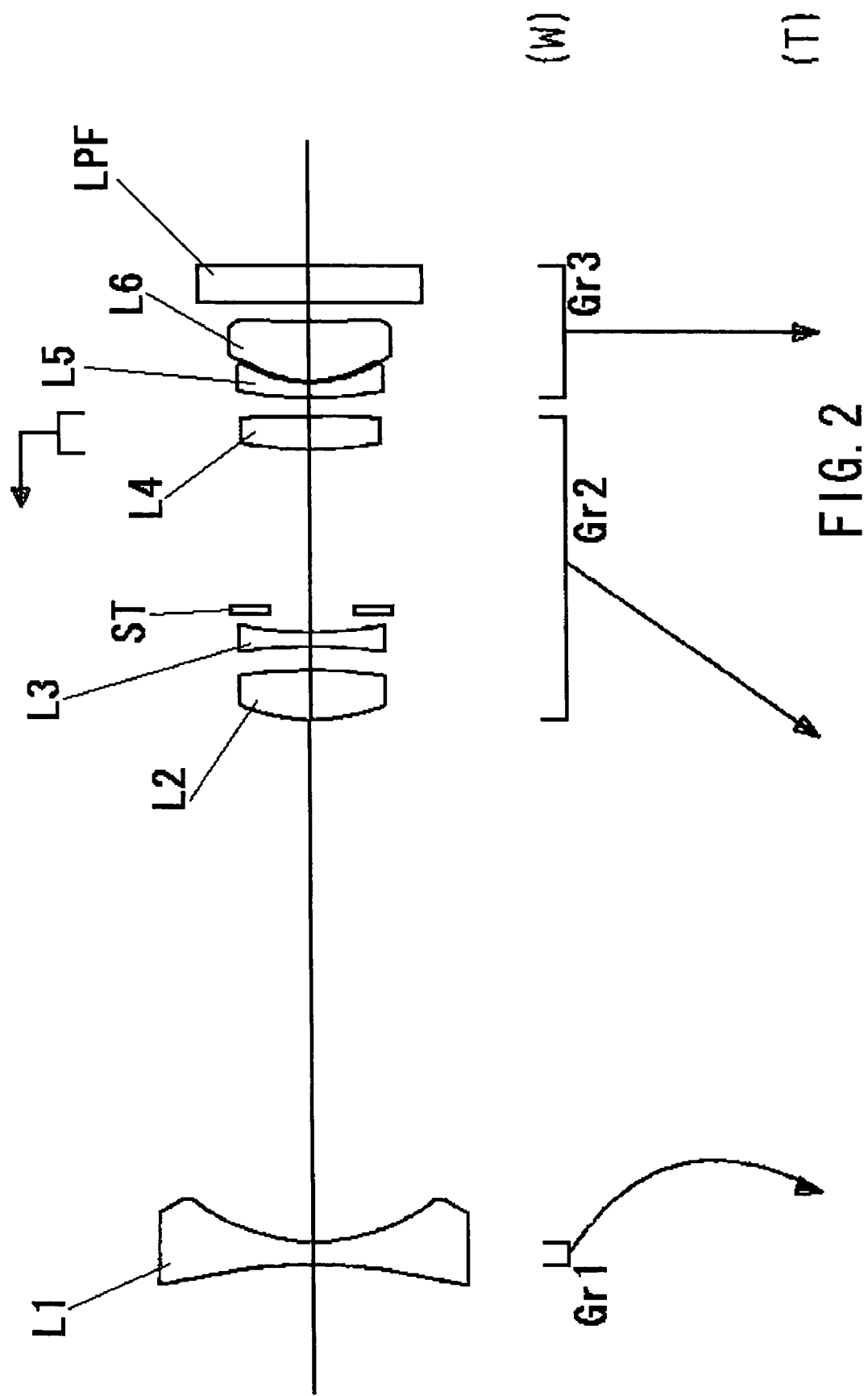
FIG. 2 is a lens arrangement view of a second embodiment (second example) of the present invention.

FIG. 2 is a view showing the lens arrangement of a zoom lens system of a second embodiment of the present invention. This zoom lens system comprises from the object side: a first lens unit Gr1 including only a first lens element L1 of a bi-concave configuration; a second lens unit Gr2 including a second lens element L2 of a bi-convex configuration, a third lens element L3 of a bi-concave configuration, a diaphragm ST, and a fourth lens element L4 of a bi-convex configuration; and a third lens unit Gr3 including a fifth lens element L5 of a negative meniscus configuration convex to the object side and a sixth lens element L6 of a positive meniscus configuration convex to the object side. In zooming from the shortest focal length condition to the longest focal length condition, the first lens unit Gr1 moves so as to draw a locus of a U-turn convex to the image side, the second lens unit Gr2 monotonously moves toward the object side, and the third lens unit Gr3 is stationary with respect to the image plane. In focusing from the infinity in-focus state to the finite object in-focus state, the fourth lens element L4 alone is moved toward the object side.

Figure 3:
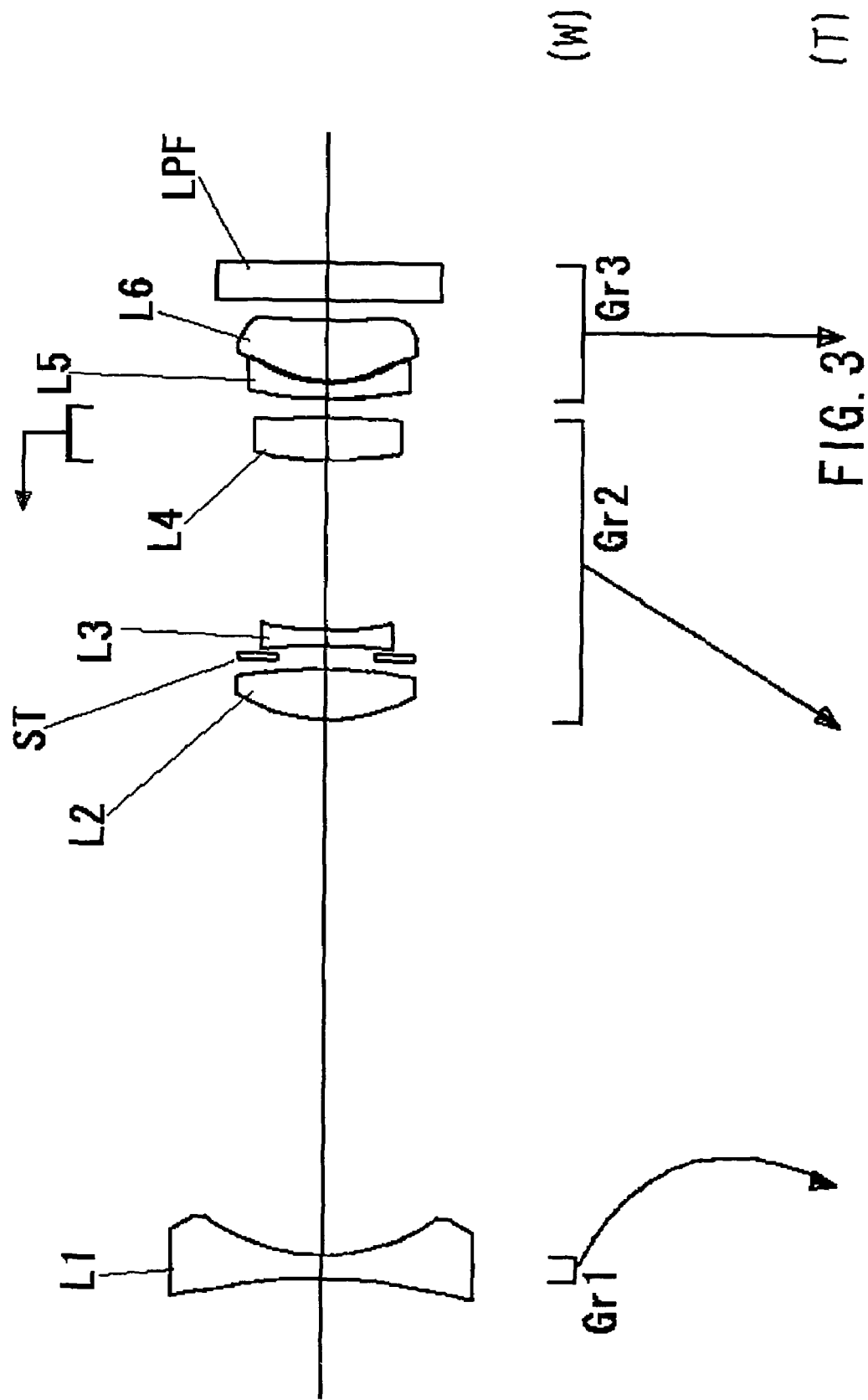
FIG. 3 is a lens arrangement view of a third embodiment (third example) of the present invention.
Figure 4:
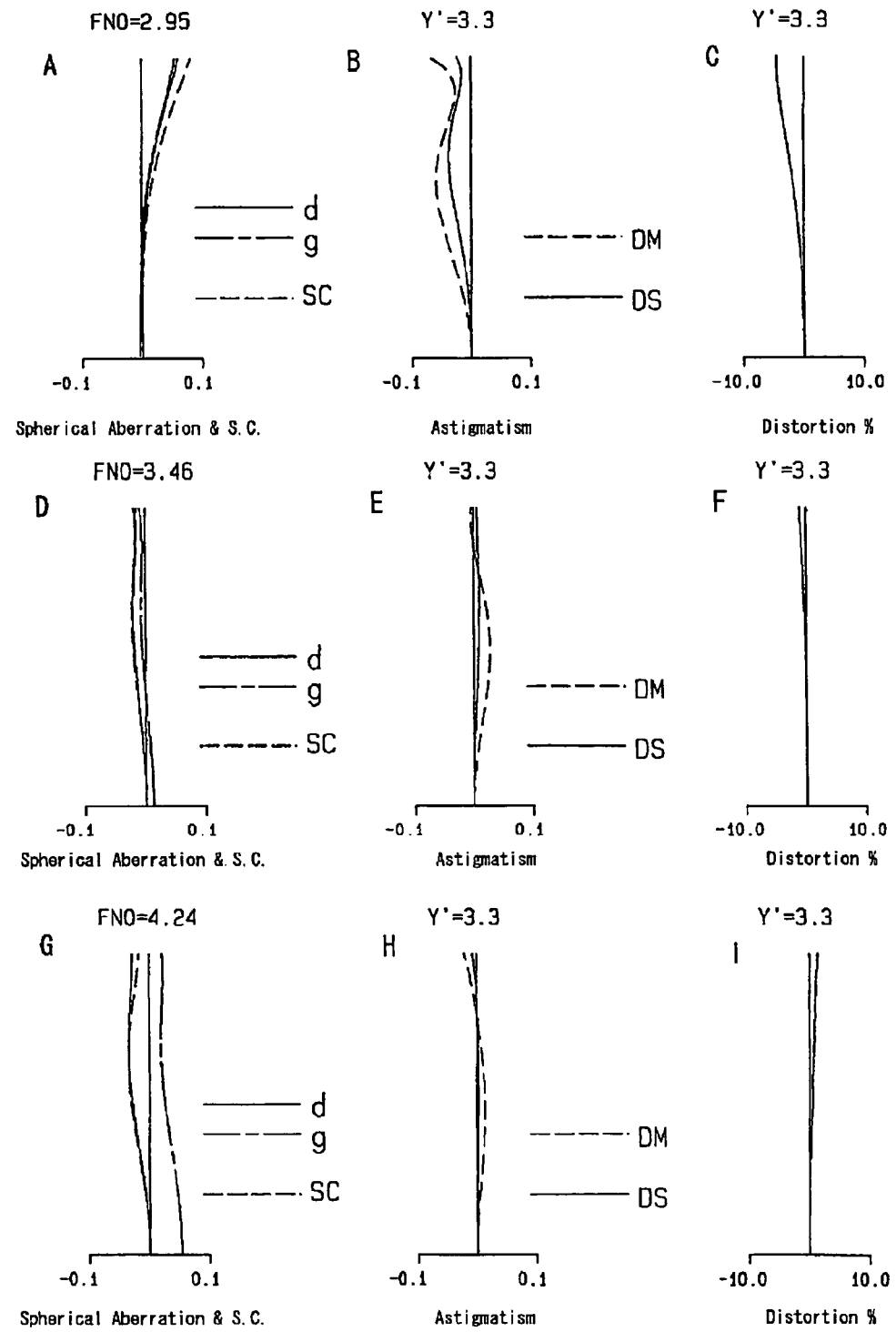
FIGS. 4A to 4I are graphic representations of aberrations of the first embodiment (first example) of the present invention in the infinity in-focus state.
Figure 5:
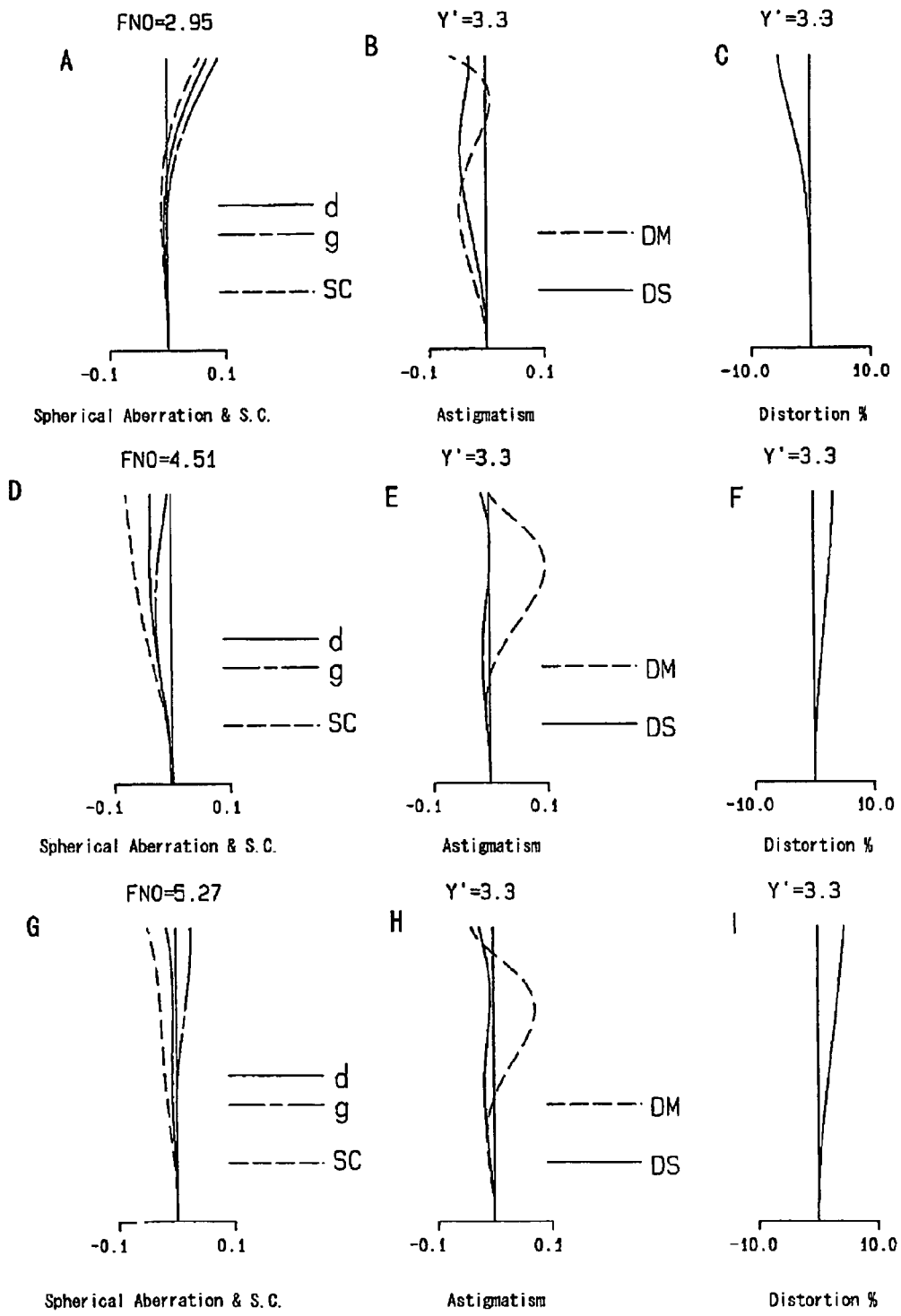
FIGS. 5A to 5I are graphic representations of aberrations of the second embodiment (second example) of the present invention in the infinity in-focus state.
Figure 6:
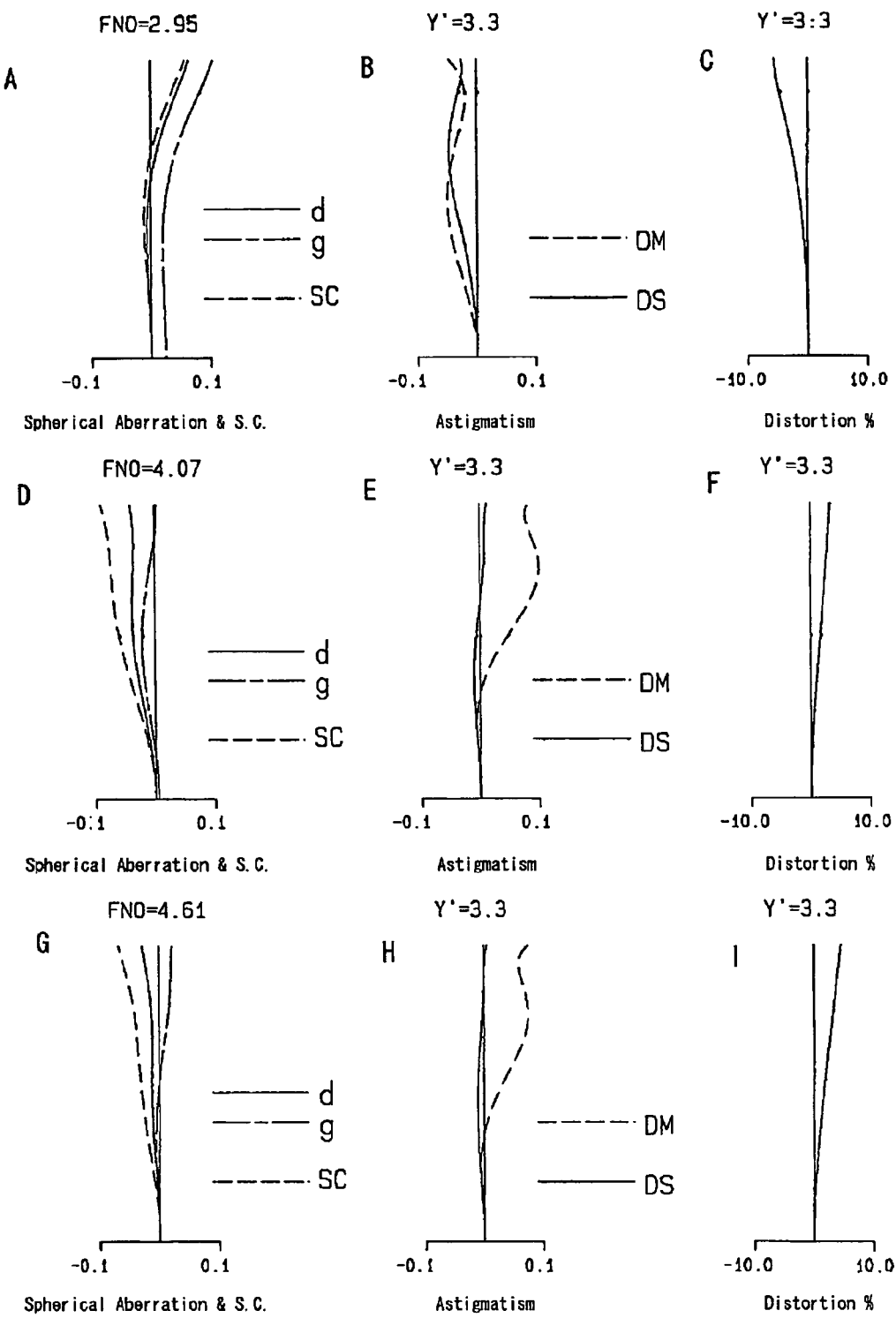
FIGS. 6A to 6I are graphic representations of aberrations of the third embodiment (third example) of the present invention in the infinity in-focus state.
Figure 7:
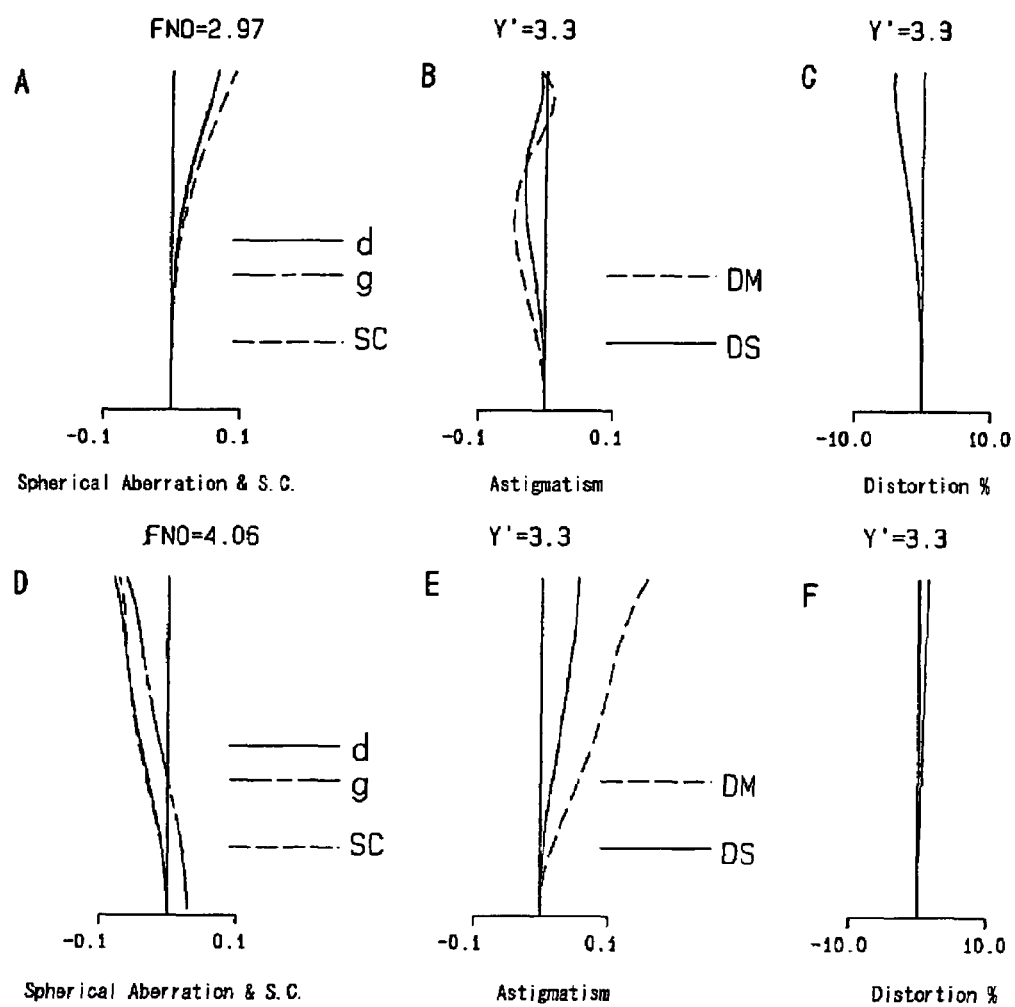
FIGS. 7A to 7F are graphic representations of aberrations of the first embodiment (first example) of the present invention in the near object in-focus state.
Figure 8:
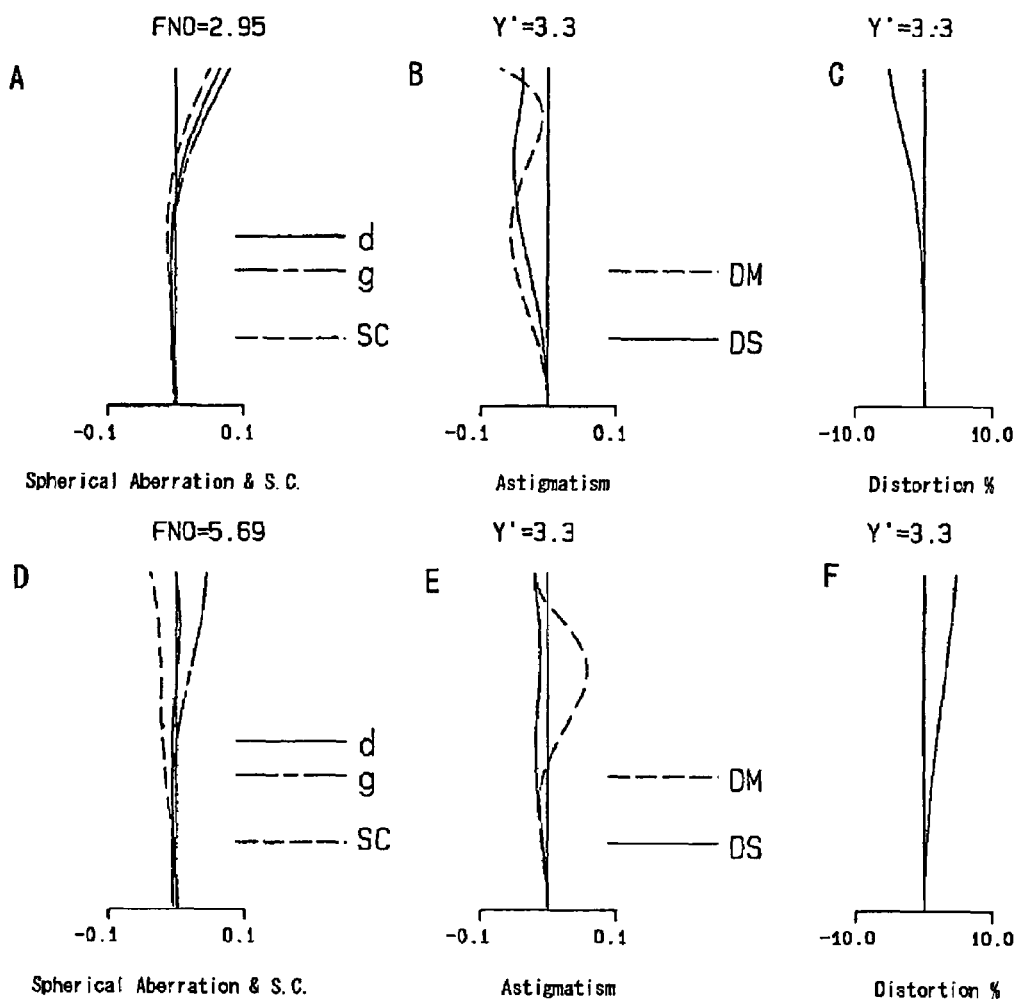
FIGS. 8A to 8F are graphic representations of aberrations of the second embodiment (second example) of the present invention in the near object in-focus state.
Figure 9:
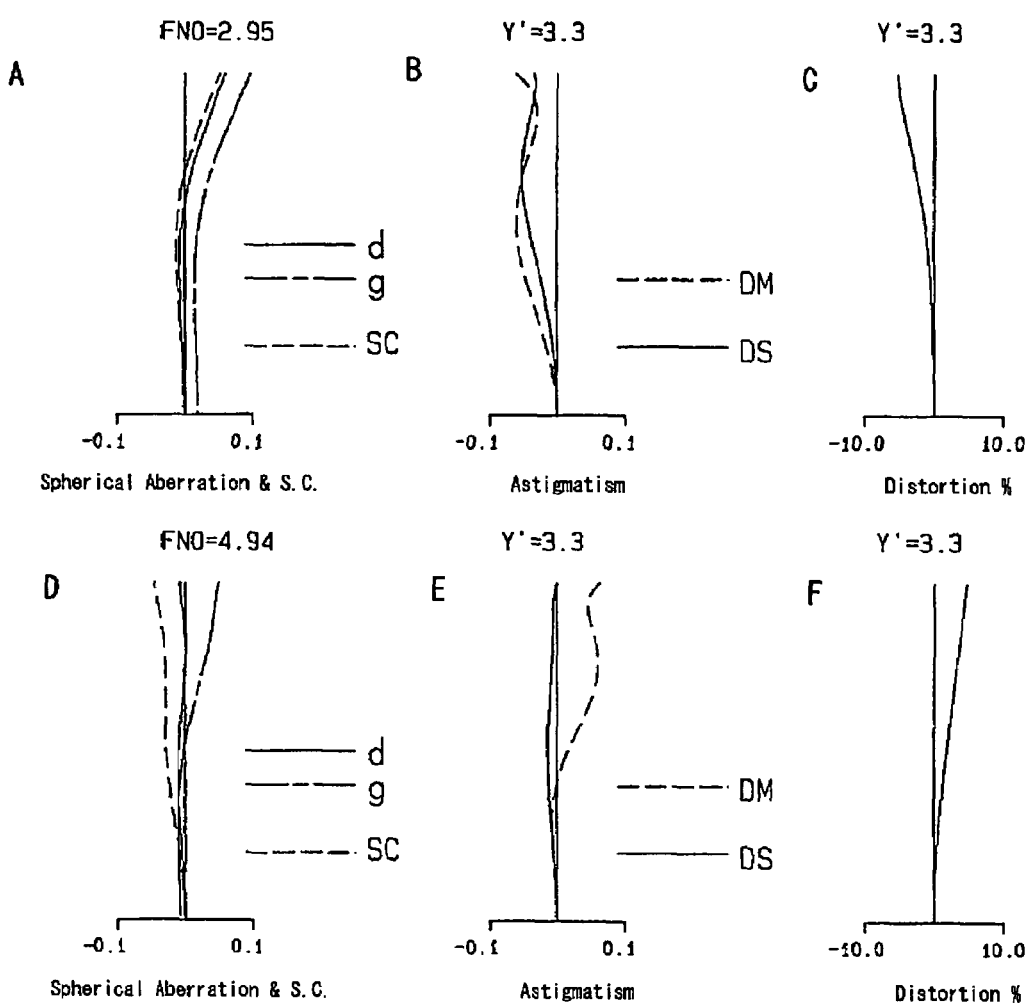
FIGS. 9A to 9F are graphic representations of aberrations of the third embodiment (third example) of the present invention in the near object in-focus state.

FIG. 3 is a view showing the lens. arrangement of a zoom lens system according to a third embodiment. This zoom lens system comprises from the object side: a first lens unit Gr1 including only a first lens element L1 of a bi-concave configuration; a second lens unit Gr2 including a second lens element L2 of a bi-convex configuration, a diaphragm ST, a third lens element L3 of a bi-concave configuration, and a fourth lens element L4 of a bi-convex configuration; and a third lens unit Gr3 including a fifth lens element L5 of a negative meniscus configuration convex to the object side and a sixth lens element L6 of a positive meniscus configuration convex to the object side. In zooming from the shortest focal length condition to the longest focal length condition, the first lens unit Gr1 moves so as to draw a locus of a U-turn convex to the image side, the second lens unit Gr2 monotonously moves toward the object side, and the third lens unit Gr3 is stationary with respect to the image plane. In focusing from the infinity in-focus state to the finite object in-focus state, the fourth lens element L4 alone is moved toward the object side.

In the zoom lens systems of these embodiments, the most image side lens unit includes a positive lens element and a negative lens element. With this arrangement, variation in axial chromatic aberration caused in the single negative lens element of the first lens unit which variation is due to zooming can be excellently corrected. In addition, this arrangement is effective in correcting off-axial coma aberration in the shortest focal length condition. Further, by making the most image side lens unit stationary with respect to the image plane, variation in axial chromatic aberration due to zooming can be more excellently corrected, and the lens barrel structure can be simplified.

Moreover, in the embodiments, it is desirable that the most image side lens unit satisfy the following condition:

$$3<|fl/fw| \quad (1)$$

where fl is the focal length of the most image side lens unit, and fw is the focal length of the zoom lens system in the shortest focal length condition.

The condition (1) defines the focal length of the most image side lens unit. In a case where the last lens unit has a positive optical power, when this range is exceeded, since the positive optical power of the most image side lens unit is too strong, the positive angle of incidence of the off-axial light on the image plane in the longest focal length condition is too large and this degrades telecentricity (a condition where the exit pupil of the optical system is at infinity), so that illumination on the image sensor cannot be secured. In a case where the last lens unit has a negative optical power, when the range is exceeded, since the negative optical power of the most image side lens unit is too strong, the negative angle of the off-axial light to the image plane in the shortest focal length condition is too large and this similarly degrades telecentricity, so that illumination on the image sensor cannot be secured.

A more marked effect is produced when the range of the condition (1) is as follows:

$$6<|fl/fw| \quad (1)'$$

Moreover, by the most image side lens unit being monotonously moved toward the image side in zooming from the shortest focal length condition to the longest focal length condition, the effect of correcting curvature of field in zooming from the middle focal length condition to the longest focal length condition is high.

Moreover, by the most image side lens unit being nonlinearly moved toward the image side in zooming from the shortest focal length condition to the longest focal length condition, curvature of field in the middle focal length condition can be effectively corrected.

Moreover, when the most image side lens unit has a positive optical power, the telecentricity of the ray incident on the image sensor can be secured.

Moreover, when the most image side lens unit has a negative optical power, coma aberration in the shortest focal length condition can be corrected.

Moreover, by the most image side lens unit including a surface that has at least one aspherical surface, curvature of field on the long focal length side can be suppressed.

Moreover, in the zoom lens systems of the embodiments, the diaphragm is disposed on the object side or the image side of the second lens unit or in the second lens unit. When the diaphragm is disposed on the image side of this position, the outer diameter of the first lens unit is too large, so that a compact zoom lens system cannot be attained.

Moreover, in the zoom lens systems of the embodiments, focusing is performed by moving on the optical axis a positive single lens element disposed in a position on the image side of the diaphragm and not included in the most image side lens unit. By the focusing lens unit being a positive lens unit or a single lens element disposed in the position on the image side of the diaphragm and not included in the most image side lens unit, focusing can be performed with a lens unit or a single lens element being lightweight and whose movement amount in focusing is small, so that the lens barrel structure and the load on the drive motor can be reduced.

It is desirable that the zoom lens systems of the embodiments have a first lens unit disposed on the most object side and including only one negative lens element. Normally, in a zoom lens system whose first lens unit has a negative optical power, the diameter of the first lens unit in the direction vertical to the optical axis is largest to secure the f-number. If the first lens unit includes a plurality of lens elements, the effective diameter of the lens element of the first lens unit will be large to secure the ray incident on the zoom lens system. Therefore, to reduce the outer diameter, it is desirable that the first lens unit include a minimum number, that is, one lens element. Moreover, when a lens element having a large diameter has a curvature, the axial air space between the lens elements increases accordingly. That is, the number of lens elements of the first lens unit is a significant factor that increases the overall length of the zoom lens system. In the zoom lens systems of the embodiments, since this negative lens unit includes a minimum number, that is, one lens element, the overall length of the zoom lens system can be reduced and the thickness when the zoom lens system is housed (hereinafter, referred to as "in the collapsed condition") can be reduced.

It is desirable that the first lens unit move so as to draw a locus convex to the image side in zooming like in the zoom lens systems of the embodiments. By the first lens unit moving in this manner, curvature of field in the middle focal length condition can be excellently corrected.

Moreover, by any of the surfaces of the first lens unit being aspherical, distortion can be suppressed.

The zoom lens systems of the embodiments include the second lens unit being overall positive and including a positive lens element and a negative lens element that are independent of each other. In minus lead zoom lens systems, the positive optical power of the second lens unit most contributes to zooming. Therefore, variation in aberrations, particularly axial chromatic aberration, caused in the second lens unit due to zooming is large. To correct this, unless the second lens unit at least includes a positive lens element and a negative lens element that are independent of each other, it is impossible to balance the axial chromatic aberration in the entire zoom range.

Moreover, the zoom lens systems satisfy the following condition:

$$2.3 \leq fw/ft \leq 5.5 \quad (2)$$

where fw is the focal length of the zoom lens system in the shortest focal length, and ft is the focal length of the zoom lens system in the longest focal length condition.

The condition (2) defines the zoom ratio of the zoom lens system. The condition (2) is defined because the zoom lens system intended by the present invention is a compact zoom lens system whose median target magnification is 3× to 4×. When the zoom ratio is lower than the lower limit of the condition (2), the significance of optical zooming is low, so that user benefit cannot be attained. When the zoom ratio is higher than the upper limit of the condition (2), the overall length in the longest focal length condition is too large, so that it is difficult to attain size reduction as a zoom lens device. It is more desirable that the zoom lens systems have a zoom ratio satisfying the following range:

$$3.1 \leq fw/ft \tag{2}'$$

Moreover, it is desirable that the zoom lens systems of the embodiments satisfy the following condition (3):

$$0.1 < T23w/fw < 1.5 \tag{3}$$

where T23w is the axial distance between the second lens unit (most image side) and the adjoining lens unit on the image side (most object side) in the shortest focal length condition, and fw is the focal length of the zoom lens system in the shortest focal length condition.

The condition (3) defines the axial distance between the second lens unit and the adjoining lens unit on the image side in the zoom lens system. When the lower limit of the condition (3) is exceeded, the possibility is high that interference such that the lens elements of the second and third lens units come into contact with each other occurs in the shortest focal length condition, so that it is difficult to structure the lens barrel. When the upper limit of the condition (3) is exceeded, the overall length in the direction of the optical axis is large in the shortest focal length condition, so that it is impossible to attain a compact zoom lens system. Moreover, when the upper limit is exceeded, because of the power arrangement, the distance between the first lens unit and the image surface is large and the overall length in the direction of the optical axis is large accordingly, and to secure illumination on the image surface, the diameter of the lens element constituting the first lens unit is large, so that it is impossible to attain a compact zoom lens system.

Moreover, the zoom lens systems of the embodiments satisfy the following condition (4):

$$0.6 < Tsum/fw < 2.6 \tag{4}$$

where Tsum is the sum of the axial thicknesses of all the lens elements included in the zoom lens system; and fw is the foal length of the zoom lens system in the shortest focal length condition.

The condition (4) defines the sum of the axial thicknesses of all the lens elements included in the zoom lens system. The size of the zoom lens system in the direction of the optical axis in the collapsed condition is the greatest factor that substantially decides the size of the digital camera and the portable information apparatus in the direction of the thickness. The size in the direction of the optical axis in the collapsed condition cannot be physically smaller than the sum of the axial thicknesses of the lens elements. Therefore, unless Tsum can be reduced, a zoom lens system that is compact in the collapsed condition cannot be attained. The condition (4) is the condition that defines the thickness in the collapsed condition. When the lower limit of the condition (4) is exceeded, it is physically difficult to structure the optical system. When the upper limit thereof is exceeded, the lens thickness is too large and exceeds the limit permitted in digital cameras and portable information apparatuses. It is more effective that the range of the condition (4) is as follows:

$$Tsum/fw < 2.2 \tag{4}'$$

$$Tsum/fw < 2.0 \tag{4}''$$

By satisfying the conditions (3) and (4) at the same time, the zoom lens system can be more effectively structured while the effects of the conditions are produced.

Moreover, in the zoom lens systems of the embodiments, when the first lens unit includes one negative lens element, it is desirable to satisfy the following condition (5):

$$v1 > 45 \tag{5}$$

where v1 is the Abbe number of the single negative lens element constituting the first lens unit.

The condition (5) defines the Abbe number of the negative lens element constituting the first lens unit. In zoom lens systems, normally, a certain extent of aberration correction is performed in each lens unit to minimize variation in aberrations caused during zooming. However, since the first lens unit is constituted by one negative lens element, correction of aberrations, particularly axial chromatic aberration, in lens units is extremely difficult. Therefore, in the zoom lens systems of the embodiments, it is necessary to balance the aberrations by canceling the axial chromatic aberration generated in the first lens unit by another lens unit. However, it is undesirable to form the negative lens element of the first lens unit of a material having an Abbe number exceeding the upper limit of the condition (5), because when this is done, variation in axial chromatic aberration exceeds the permissible range that can be corrected by another lens unit.

With respect to the condition (5), it is more desirable to satisfy the condition (5)', further the condition (5)'':

$$v1 > 60 \tag{5}'$$

$$v1 > 80 \tag{5}''$$

Moreover, by using a material having anomalously low dispensability for the negative lens element constituting the first lens unit, further chromatic aberration correction can be attained. Moreover, since it is desirable that the negative lens element constituting the first lens unit have an aspherical configuration for the purpose of distortion correction and the like, the negative lens element may be a resin lens element, satisfying the condition (5), where it is easy to form an aspherical surface.

While the lens units of the above-described first to third embodiments comprise only refractive type lens elements that deflect the incident ray by refraction, the present invention is not limited thereto. For example, the lens units may comprise diffractive type lens elements that deflect the incident ray by diffraction, refractive-diffractive hybrid lens elements that deflect the incident ray by a combination of diffraction and refraction, or the like.

Moreover, a reflecting member may be added that bends the optical axis of the incident ray by appropriately adjusting the air distances existing in the lens units and between the lens units. By bending the optical axis of the incident ray, the degree of freedom of the arrangement of the optical system improves and the thickness of the optical device in the direction of the optical axis of the incident ray can be reduced.

The construction of zoom lens systems embodying the present invention will be more concretely described with reference to construction data, graphic representations of aberrations and the like. A first to third examples shown below correspond to the above-described first to third embodiments, respectively. The lens arrangement views (FIGS. 1 to 3) showing the first to third embodiments show the lens arrangements of the corresponding first to third examples.

In the construction data of the examples, ri (i=1,2,3, ...) is the radius of curvature of the i-th surface counted from the object side, di (i=1,2,3, ...) is the i-th axial distance counted from the object side, and Ni (i=1,2,3, ...) and vi (i=1,2,3, ...) are the refractive index (Nd) and the Abbe number (vd), to the d-line, of the i-th optical element counted from the object side. In the construction data, the axial distances that vary during zooming (variable distances) are axial air distances between the lens units in the shortest focal length condition (short focal length side end) [W], in the middle (middle focal length condition) [M] and in the longest focal length condition (long focal length side end) [T]. The overall focal lengths f and the f-numbers FNO in the focal length conditions [W], [M] and [T] are shown together with other data.

The surfaces whose radii of curvature ri are marked with asterisks are aspherical surfaces, and are defined by the following expression (AS) expressing the surface configuration of aspherical surfaces. Aspherical data of the examples are shown together with other data.

$$Z(h)=r-(r^2-\epsilon \cdot h^2)^{1/2}+(A4 \cdot h^4+A6 \cdot h^6+A8 \cdot h^8+\ldots) \quad (AS)$$

where r is the paraxial radius of curvature of the aspherical surface, $\epsilon$ is the elliptic coefficient, and Ai is the i-th-order aspherical coefficient of the aspherical surface.

EXAMPLE 1 f = 6.0 – 10.8 – 17.3 mm
FNo. = 2.95 – 3.46 – 4.24

| [Radius of Curvature] | [Axial Distance] | [Refractive Index(Nd)] | [Abbe Number(vd)] |
|---|---|---|---|
| r1* = −180.565 | d1 = 1.000 | N1 = 1.49310 | ν1 = 83.58 |
| r2* = 8.101 | d2 = 22.102 – 8.977 – 3.301 | | |
| r3 = ∞ | d3 = 0.600 | | |
| r4 = 6.286 | d4 = 2.725 | N2 = 1.74159 | ν2 = 43.17 |
| r5 = −29.861 | d5 = 1.300 | | |
| r6* = −11.145 | d6 = 1.000 | N3 = 1.84666 | ν3 = 23.82 |
| r7* = 10.004 | d7 = 3.742 – 4.916 – 4.596 | | |
| r8 = 21.104 | d8 = 2.414 | N4 = 1.80513 | ν4 = 44.41 |
| r9 = −20.523 | d9 = 1.000 – 6.985 – 16.317 | | |
| r10 = 10.089 | d10 = 3.566 | N5 = 1.48749 | ν5 = 70.44 |
| r11 = −8.086 | d11 = 0.100 | | |
| r12 = −7.873 | d12 = 0.800 | N6 = 1.58340 | ν6 = 30.23 |
| r13* = 25.439 | d13 = 2.550 – 2.460 – 1.116 | | |
| r14 = ∞ | d14 = 2.000 | N7 = 1.51633 | ν7 = 64.14 |
| r15 = ∞ | | | |

[Aspherical Coefficient]

r1

$\epsilon$ = 0.10000E+01
A4 = −0.75826E−03
A6 = 0.34105E−04
A8 = −0.50991E−06
A10 = 0.25871E−08 r2

$\epsilon$ = 0.10000E+01
A4 = −0.10941E−02
A6 = 0.26338E−04
A8 = 0.51284E−06
A10 = −0.16952E−07 r6

$\epsilon$ = 0.10000E+01
A4 = −0.31416E−03
A6 = 0.93704E−05
A8 = 0.43331E−05
A10 = −0.34297E−06 r7

$\epsilon$ = 0.10000E+01
A4 = 0.55006E−03
A6 = 0.43702E−04
A8 = 0.29782E−05
A10 = −0.26895E−06 r13

$\epsilon$ = 0.10000E+01
A4 = 0.55321E−03
A6 = −0.23535E−04
A8 = 0.11220E−05
A10 = −0.93429E−08

EXAMPLE 2

| | f = 5.6 – 16.1 – 21.2 mm | | |
| | FNo. = 2.95 – 4.51 – 5.27 | | |
| [Radius of Curvature] | [Axial Distance] | [Refractive Index(Nd)] | [Abbe Number(νd)] |
| --- | --- | --- | --- |
| r1* = −39.852 | d1 = 1.200 | N1 = 1.49310 | ν1 = 83.58 |
| r2* = 7943 | d2 = 27.324 – 5.086 – 2.210 | | |
| r3 = 9.089 | d3 = 2.617 | N2 = 1.75450 | ν2 = 51.57 |
| r4 = −26.827 | d4 = 1.220 | | |
| r5* = −45.076 | d5 = 0.800 | N3 = 1.84666 | ν3 = 23.82 |
| r6* = 18.718 | d6 = 1.188 | | |
| r7 = ∞ | d7 = 8.466 | | |
| r8 = 19.274 | d8 = 1.710 | N4 = 1.76213 | ν4 = 50.28 |
| r9 = −79.564 | d9 = 1.000 – 13.487 – 19.631 | | |
| r10 = 19.602 | d10 = 0.800 | N5 = 1.79850 | ν5 = 22.60 |
| r11 = 6.499 | d11 = 0.100 | | |
| r12* = 5.624 | d12 = 3.076 | N6 = 1.52510 | ν6 = 56.38 |
| r13* = 67.250 | d13 = 1.000 | | |
| r14 = ∞ | d14 = 2.000 | N7 = 1.51680 | ν7 = 64.20 |
| r15 = ∞ | | | |

[Aspherical Coefficient]

r1

$\epsilon$ = 0.10000E+01
A4 = −0.64385E−03
A6 = 0.20445E−04
A8 = −0.22702E−06
A10 = 0.79381E−09 r2

$\epsilon$ = 0.10000E+01
A4 = −0.10137E−02
A6 = 0.90231E−05
A8 = 0.49260E−06
A10 = −0.10596E−07 r5

$\epsilon$ = 0.10000E+01
A4 = −0.61443E−03
A6 = 0.40451E−04
A8 = −0.38476E−05
A10 = 0.18991E−06 r6

$\epsilon$ = 0.10000E+01
A4 = −0.28745E−03
A6 = 0.58066E−04
A8 = −0.54298E−05
A10 = 0.27306E−06 r12

$\epsilon$ = 0.10000E+01
A4 = 0.65072E−03
A6 = −0.30424E−03
A8 = 0.28044E−04
A10 = −0.12221E−05 r13

$\epsilon$ = 0.10000E+01
A4 = 0.27656E−02
A6 = −0.45141E−03
A8 = 0.33907E−04
A10 = −0.12549E−05

EXAMPLE 3

| | f = 5.6 – 16.1 – 21.3 mm | | |
| | FNo. = 2.95 – 4.07 – 4.61 | | |
| [Radius of Curvature] | [Axial Distance] | [Refractive Index(Nd)] | [Abbe Number(vd)] |
| --- | --- | --- | --- |
| r1* = −35.240 | d1 = 1.200 | N1 = 1.49310 | ν1 = 83.58 |
| r2* = 8.469 | d2 = 27.719 – 4.808 – 1.846 | | |
| r3 = 8.794 | d3 = 2.582 | N2 = 1.74754 | ν2 = 51.81 |
| r4 = −25.730 | d4 = 0.600 | | |
| r5 = ∞ | d5 = 0.600 | | |
| r6* = −42.662 | d6 = 0.800 | N3 = 1.84666 | ν3 = 23.82 |
| r7* = 17.339 | d7 = 8.811 | | |
| r8 = 18.677 | d8 = 2.126 | N4 = 1.78578 | ν4 = 46.80 |
| r9 = −72.376 | d9 = 1.000 – 12.250 – 17.785 | | |
| r10 = 21.040 | d10 = 0.800 | N5 = 1.79850 | ν5 = 22.60 |
| r11 = 6.402 | d11 = 0.115 | | |
| r12* = 5.787 | d12 = 3.146 | N6 = 1.52510 | ν6 = 56.38 |
| r13* = 69.497 | d13 = 1.000 | | |
| r14 = ∞ | d14 = 2.000 | N7 = 1.51680 | ν7 = 64.20 |
| r15 = ∞ | | | |

[Aspherical Coefficient]

r1

$\epsilon$ = 0.10000E+01
A4 = −0.62293E−03
A6 = 0.22312E−04
A8 = −0.26635E−06
A10 = 0.96658E−09 r2

$\epsilon$ = 0.10000E+01
A4 = −0.92271E−03
A6 = 0.10117E−04
A8 = 0.59055E−06
A10 = −0.13036E−07 r6

$\epsilon$ = 0.10000E+01
A4 = −0.68242E−03
A6 = 0.42598E−04
A8 = −0.36680E−05
A10 = 0.18704E−06 r7

$\epsilon$ = 0.10000E+01
A4 = −0.32785E−03
A6 = 0.63607E−04
A8 = −0.55179E−05
A10 = 0.28183E−06 r12

$\epsilon$ = 0.10000E+01
A4 = 0.57448E−03
A6 = −0.28415E−03
A8 = 0.26250E−04
A10 = −0.11729E−05 r13

$\epsilon$ = 0.10000E+01
A4 = 0.26346E−02
A6 = −0.43696E−03
A8 = 0.33701E−04
A10 = −0.12629E−05

FIGS. 4A to 4I through 6A to 6I and FIGS. 7A to 7F through FIGS. 9A to 9F are graphic representations of aberrations of the first to third examples. FIGS. 4A to 4I through 6A to 6I show aberrations of the first to third examples in the infinity in-focus state. FIGS. 7A to 7F through 9A to 9F show aberrations of the first to third examples in the near object (object distance 40 cm) in-focus state. FIGS. 4A to 4C, 5A to 5C, 6A to 6C, 7A to 7C, 8A to 8C, and 9A to 9C show aberrations (from the left, spherical aberration and sine condition, astigmatism, and distortion; Y' is the image height) in the shortest focal length condition. FIGS. 4D to 4F, 5D to 5F, and 6D to 6F show the aberrations in the middle focal length condition. FIGS. 4G to 4I, 5G to 5I, 6G to 6I, 7D to 7F, 8D to 8F, and 9D to 9F show the aberrations in the longest focal length condition. In the graphic representations of spherical aberration, the solid line (d) and the chain line (g) show spherical aberrations to the d-line and to the g-line, respectively, and the broken line (SC) shows sine condition. In the graphic representations of astigmatism, the broken line (DM) and the solid line (DS) show astigmatisms to the d-line on the meridional image plane and the sagittal image plane, respectively.

As described above, according to the zoom lens device of the present invention, a zoom lens device can be provided that has a zoom lens system that is sufficiently small in the length in the direction of the optical axis when housed although having a high zoom ratio.

Moreover, according to the zoom lens device of the present invention, a zoom lens device can be provided that has a zoom lens system being bright even in the longest focal length condition and sufficiently small in the length in the direction of the optical axis when housed.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A zoom lens system for directing an optical image on an electric image sensor, said zoom lens system comprising:
    a first lens unit disposed on a most object side and having a negative optical power;
    a second lens unit having a positive optical power; and
    a following lens unit including at least a third lens unit and a fourth lens unit,
wherein at least one lens unit included in the following lens unit has at least a positive lens element and a negative lens element,
    wherein the following condition is satisfied:

$3<|fl/fw|$ where fl is a focal length of the most image side lens unit, and fw is a focal length of the zoom lens system in a shortest focal length condition; and
    wherein the focusing is performed by moving on the optical axis a positive single lens element disposed in a position on the image side of a diaphragm, the positive single lens element not included in the most image side lens unit.

2. A zoom lens system as claimed in claim 1 wherein the most image side lens unit has a positive optical power.

3. A zoom lens system as claimed in claim 1 wherein the most image side lens unit has a negative optical power.

4. A zoom lens system as claimed in claim 1 wherein the most image side lens unit includes at least one aspherical surface.

5. A zoom lens system as claimed in claim 1 wherein the first lens unit includes only one negative lens element.

6. A zoom lens system as claimed in claim 1 wherein the first lens unit is moved so as to draw a locus convex to the image side in zooming from the shortest focal length condition to the longest focal length condition.

7. A zoom lens system as claimed in claim 1 wherein the zoom lens system satisfies the following condition:

$v1>45$ where v1 is the Abbe number of a single negative lens element constituting the first lens unit.

8. A zoom lens system as claimed in claim 1 wherein the zoom lens system satisfies the following condition:

$2.3 \leq ft/fw \leq 5.5$ where fw is the focal length of the zoom lens system in the shortest focal length, and ft is the focal length of the zoom lens system in the longest focal length condition.

9. An image capturing device comprising:
    a zoom lens system, said zoom lens system including:
    a first lens unit disposed on a most object side and having a negative optical power;
    a second lens unit having a positive optical power; and
    a following lens unit including at least a third lens unit and a fourth lens unit,
wherein at least one lens unit included in the following lens unit has at least a positive lens element and a negative lens element,
    wherein the following condition is satisfied:

$3<|fl/fw|$ where fl is a focal length of the most image side lens unit, and fw is a focal length of the zoom lens system in a shortest focal length condition; and
    wherein the focusing is performed by moving on the optical axis a positive single lens element disposed in a position on the image side of a diaphragm, the positive single lens element not included in the most image side lens unit, and
    an electric image sensor converting an optical image formed by the zoom lens system into electric image data.

10. A digital camera comprising:
    a zoom lens system, said zoom lens system including:
    a first lens unit disposed on a most object side and having a negative optical power;
    a second lens unit having a positive optical power; and
    a following lens unit including at least a third lens unit and a fourth lens unit,
wherein at least one lens unit included in the following lens unit has at least a positive lens element and a negative lens element,
    wherein the following condition is satisfied:

$3<|fl/fw|$ where fl is a focal length of the most image side lens unit, and fw is a focal length of the zoom lens system in a shortest focal length condition; and
    wherein the focusing is performed by moving on the optical axis a positive single lens element disposed in a position on the image side of a diaphragm, the positive single lens element not included in the most image side lens unit, and
    an electric image sensor converting an optical image formed by the zoom lens system into electric image data.

* * * * *